(12) United States Patent
Dekel (10) Patent No.: US 8,125,549 B2
(45) Date of Patent: Feb. 28, 2012

(54) METHODS AND APPARATUS TO CAPTURE COMPRESSED IMAGES

(75) Inventor: Shai Dekel, Ramat-Hasharon (IL)

(73) Assignee: General Electric Company, Schenectady, NY (US)

( * ) Notice: Subject to any disclaimer, the term of this patent is extended or adjusted under 35 U.S.C. 154(b) by 767 days.

(21) Appl. No.: 12/202,544

(22) Filed: Sep. 2, 2008

(65) Prior Publication Data
US 2010/0053352 A1   Mar. 4, 2010

(51) Int. Cl.
*H04N 5/335* (2006.01)
(52) U.S. Cl. .................................. 348/294; 348/335
(58) Field of Classification Search ............ 348/207.99, 348/222.1, 294, 239, 335, 218.1; 375/216
See application file for complete search history.

(56) References Cited

U.S. PATENT DOCUMENTS

| 7,532,772 B2 * | 5/2009 | Brady ........................... 382/299 |
| 2006/0239336 A1 * | 10/2006 | Baraniuk et al. .............. 375/216 |

OTHER PUBLICATIONS

Richard Baraniuk, "A Lecture on Compressive Sensing," to appear in IEEE Signal Processing Magazine (preprint), Jul. 2007, 9 pages.
Emamnuel J. Candes, "Compressive Sampling," Proceedings of the International Congress of Mathematicians, 2006, 20 pages, European Mathematical Society, Madrid, Spain.
Ronald A. Devore, "Nonlinear Approximation," Acta Numerica, 1998, pp. 51-150, Cambridge University Press.
La et al., "Signal Reconstruction using Sparse Tree Representations," Proceedings SPIE Wavelets XI, San Diego, Sep. 2005, 11 pages.
Said et al., "A New Fast and Efficient Image Codec Based on Set Partitioning in Hierarchical Trees," IEEE Transactions on Circuits and Systems for Video Technology, Jun. 1996, 16 pages, vol. 6.
Jerome M. Shapiro, "Embedded Image Coding Using Zerotrees of Wavelet Coefficients," IEEE Transactions on Signal Processing, Dec. 1993, 18 pages, vol. 41.
Takhar et al., "A New Compressive Imaging Camera Architecture using Optical-Domain Compression," Society of Photo-Optical Instrumentation Engineers, 2006, 10 pages.

* cited by examiner

*Primary Examiner* — Tuan Ho
(74) *Attorney, Agent, or Firm* — Hanley, Flight & Zimmerman, LLC (57) ABSTRACT

Example methods and apparatus to capture compressed images are disclosed. A disclosed example method includes capturing a first output of a first photodetector representative of a first weighted sum of the a plurality of portions of an image, capturing a second output of a second photodetector representative of a second weighted sum of a second plurality of portions of the image, and computing a first wavelet coefficient for the image using the first and second captured outputs.

24 Claims, 4 Drawing Sheets

METHODS AND APPARATUS TO CAPTURE COMPRESSED IMAGES

FIELD OF THE DISCLOSURE

This disclosure relates generally to image capture and, more particularly, to methods and apparatus to capture compressed images.

BACKGROUND

Traditionally, an image is captured or acquired by projecting the image onto one or more photodetectors, which convert light into a current or voltage. The currents or voltages are subsequently converted to digital signals or values via, for example, one or more analog-to-digital converters. The digital values are stored together in a file, memory(-ies) and/or memory device(s) that represent the original image. In some examples, the digital values are quantized, compressed and/or encoded prior to storage.

BRIEF DESCRIPTION OF THE INVENTION

Example methods and apparatus to capture compressed images are disclosed. A disclosed example method includes capturing a first output of a photodetector representative of a first weighted sum of a first plurality of portions of an image, capturing a second output of the detector representative of a second weighted sum of a second plurality of portions of the image, and computing a first wavelet coefficient for the image using the first and second captured outputs.

A disclosed example apparatus includes a mirror array module, a mirror module controller to control the mirror array module to reflect a first plurality of portions of an image onto a detector at a first time and to reflect a second plurality of portions of the image onto the detector at a second time, a converter to form a first value representative of a first output of the detector at the first time and to form a second value representative of a second output of the detector at the second time, and a coefficient computation module to compute a first wavelet coefficient for the image using the first and second values.

DETAILED DESCRIPTION

Figure 1:
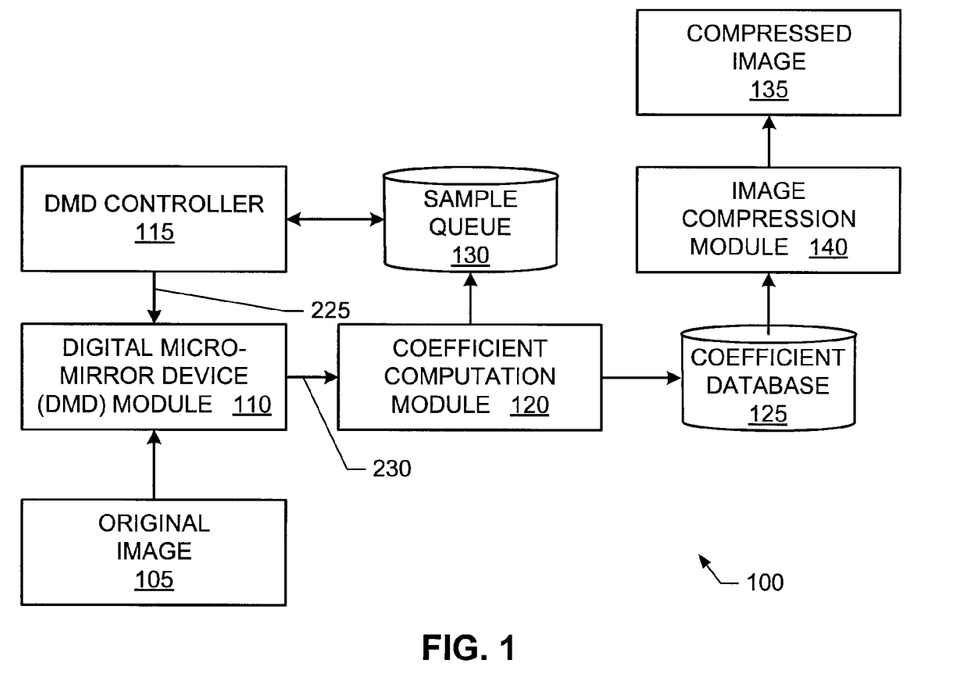
FIG. 1 is a schematic illustration of an example compressed-image capture device.

FIG. 1 is a schematic illustration of an example compressed-image capture device 100 constructed in accordance with the teachings of this disclosure. The example compressed-image capture device 100 of FIG. 1 captures and/or acquires an image 105 directly in a compressed domain (e.g., directly as wavelet coefficients) obviating either: (a) the need to first capture all portions (e.g., pixels) of the image 105 and then compress the captured image or (b) the need to acquire the image using a representation that is incoherent with wavelets (e.g., using pseudo-random mask) and then compute wavelet coefficients using 'sparsity' minimization. Such traditional approaches require large amounts of memory to store the original or un-compressed image 105, and significant computational resources to compress the captured image. During operation, the example compressed-image capture device 100 of FIG. 1 uses previously captured, measured and/or acquired wavelet coefficients to adjust and/or determine whether and/or which additional wavelet coefficients should be captured, measured and/or acquired, which: (a) reduces the time and complexity to obtain or capture a compressed image, (b) allows the quality of a captured compressed image 135 to be adaptive adjusted or controlled, and (c) facilitates a low complexity decoding and/or reconstruction process. The example compressed-image capture device 100 of FIG. 1 may be used to capture and/or acquire compressed images 135 for any type of imaging device such as, but not limited to, a medical imaging or diagnostic device. In some examples, the compressed-image capture device 100 is used to acquire and compress a video stream. In such examples, each frame of the video stream is represented by an image 105, and wavelet coefficients for each video frame are captured, measured and/or acquired by the example compressed-image capture device 100. By directly sampling wavelet coefficients, the example compressed-image capture device 100 of FIG. 1 performs substantially less measurements than would be required to capture all of the pixels of the original image 105. The original image 105 can be substantially reconstructed from the captured compressed data (i.e., wavelet coefficients) 125. The quality of the reconstructed image depends on the number of captured wavelet coefficients 125.

Figure 2:
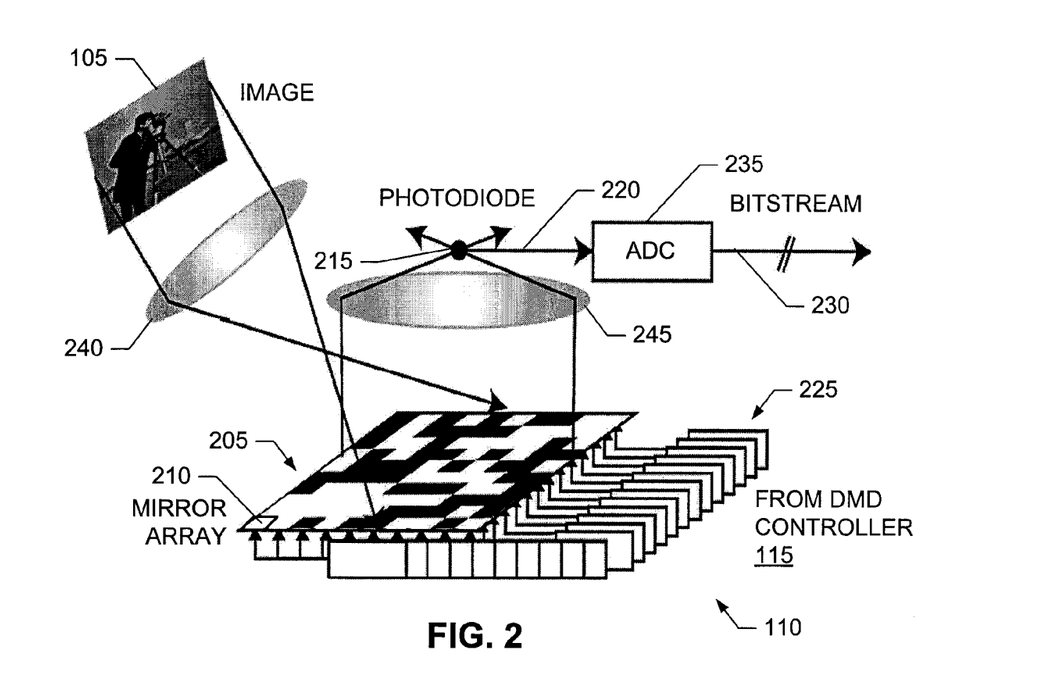
FIG. 2 illustrates an example manner of implementing the example digital micro-mirror device (DMD) module of FIG. 1.

To compute a value representative of a sum of one or more portions of the image 105, the example compressed-image capture device 100 of FIG. 1 includes a digital micro-mirror (DMD) module 110. As shown in FIG. 2, the example DMD module 110 of FIG. 2 includes an array 205 of electrostatically actuated micro-mirrors (one of which is designated at reference numeral 210) that are each suspended above a corresponding static random-access memory (SRAM) cell, and individually configurable and/or controllable to reflect a corresponding portion of the image 105 onto a detector 215. An example detector 215 includes a photodetector such as a photodiode. Each mirror 210 of the example mirror array 205 is individually positionable, controllable and/or configurable to reflect a corresponding portion (e.g., pixel) of the image 105 either (a) onto the detector 210 or (b) such that the corresponding portion does not contribute to an output 220 of the detector 215. By controlling all or a set of the mirrors 210 of the mirror array 205 to reflect corresponding portions of the image 105 onto the detector 215, the output 220 of the detector 215 represents a sum of the reflected portions of the image 105. When only a single mirror 210 reflects its corresponding portion onto the detector 215, the output 220 only represents a single portion (e.g., pixel of the image 105). The positions of the mirrors 210 are controlled and/or configured by control signals 225 created and/or provided by a DMD controller 115 (FIG. 1). An example mirror array 205 has mirrors 210 that are positionable at either +12 degrees or −12 degrees with respect to horizontal. When a mirror 210 is positioned at +12 degrees its corresponding portion of the image 105 is projected onto the detector 215.

To convert the output 220 of the detector 215 into a digital representation 230, the example DMD module 110 of FIG. 2 includes any type of analog-to-digital converter (ADC) 235. Using any number and/or type(s) of circuit(s), components and/or topologies, the example ADC 235 of FIG. 2 converts detector outputs 220 into a digital form (e.g., a stream of digital samples or values 230) suitable for processing by remaining portions of the example compressed-image capture device 110 of FIG. 1. An example ADC 235 includes a 12-bit converter. The example DMD module 110 of FIG. 2 may include one or more filters, one or more gain amplifiers, in addition to the ADC 235, that operate on the detector output 220.

To project and/or focus the image 105 onto the mirror array 205, the example DMD module 110 of FIG. 2 includes any number and/or type(s) of lenses, one of which is designated at reference numeral 240. Likewise, to project and/or focus light reflected by the mirrors 210 onto the detector 215, the example DMD module 110 of FIG. 2 includes any number and/or type(s) of lenses, one of which is designated at reference numeral 245.

While an example manner of implementing the example DMD module 110 of FIG. 1 is illustrated in FIG. 2, one or more of the elements illustrated in FIG. 2 may be combined, divided, re-arranged, omitted, eliminated and/or implemented in any other way. Further, a DMD module may include elements instead of, or in addition to, those illustrated in FIG. 2 and/or may include more than one of any or all of the illustrated elements. For example, while a single mirror array 205 and detector 215 are shown in FIG. 2, a DMD module could implement more than one mirror array and detector. For example, by implementing more than one mirror array and detector, sums of different portions of the image 105 may be performed substantially in parallel (i.e., at substantially the same time). When more than one mirror array is implemented, the mirror arrays may be associated with disjoint and/or overlapping sections of the image 105. Because the example methods and apparatus described herein adaptively and/or recursively navigate a wavelet tree, different sections of the image 105 can be processed in parallel with non-overlapping mirror arrays.

Returning to FIG. 1, the wavelet coefficient associated with a Haar wavelet of type 1 can be expressed mathematically as:

$$\langle f, \Psi^1_{j,k} \rangle = \int_{\mathfrak{R}^2} f(x) \Psi^1_{j,k}(x)\, dx, \qquad \text{EQN (1)}$$

where $\mathfrak{R}^2$ is the two-dimensional space of real numbers, f represents the image 105 at a two-dimensional location x, and $\Psi^1_{j,k}$ represents the univariate orthonormal Haar basis function of scale or resolution j and location k. Rewriting EQN (1) in discrete form, and substituting the univariate Haar scaling function φ and the Haar wavelet ψ for the Haar basis function $\Psi^1_{j,k}$, the wavelet coefficient associated with a Haar wavelet of type 1 can be expressed as:

$$\langle f, \Psi^1_{j,k} \rangle = \qquad \text{EQN (2)}$$
$$2^{-j} \left( \sum_{i_1=2^{jk_1}}^{2^{j(k_1+1)}} \sum_{i_2=2^{jk_2}}^{2^{j(k_2+1/2)}} f(i_1, i_2) - \sum_{i_1=2^{jk_1}}^{2^{j(k_1+1)}} \sum_{i_2=2^{j(k_2+1/2)}}^{2^{j(k_2+1)}} f(i_1, i_2) \right),$$

where f(i$_1$, i$_2$) represents a portion of the image 105 corresponding to particular mirror 210 (FIG. 2). As shown in EQN (2), a wavelet coefficient of type 1 can be computed by computing two sums over appropriate portions of the image 105 (i.e., measuring two outputs of the detector 215), computing a difference of the sums, and multiplying the difference with a scale factor. In EQN (2), the indices for the summation operators define which portions of the image 105 are included in a particular sum. Ex Wavelet coefficients of types 2 and 3 can likewise be expressed in discrete mathematical forms, as shown in EQN (3) and EQN (4), respectively. The mathematical expressions of EQN (3) and EQN (4) indicate that wavelet coefficients of types 2 and 3 may also be computed using two outputs of the detector 215 (i.e., using two sums).

$$\langle f, \Psi^2_{j,k} \rangle = \qquad \text{EQN (3)}$$
$$2^{-j} \left( \sum_{i_1=2^{jk_1}}^{2^{j(k_1+1/2)}} \sum_{i_2=2^{jk_2}}^{2^{j(k_2+1)}} f(i_1, i_2) - \sum_{i_1=2^{j(k_1+1/2)}}^{2^{j(k_1+1)}} \sum_{i_2=2^{jk_2}}^{2^{j(k_2+1)}} f(i_1, i_2) \right)$$

$$\langle f, \Psi^3_{j,k} \rangle = 2^{-j} \left( \sum_{i_1=2^{jk_1}}^{2^{j(k_1+1/2)}} \sum_{i_2=2^{jk_2}}^{2^{j(k_2+1/2)}} f(i_1, i_2) + \qquad \text{EQN (4)} \right.$$
$$\sum_{i_1=2^{j(k_1+1/2)}}^{2^{j(k_1+1)}} \sum_{i_2=2^{j(k_2+1/2)}}^{2^{j(k_2+1)}} f(i_1, i_2) \Bigg) -$$
$$2^{-j} \left( \sum_{i_1=2^{jk_1}}^{2^{j(k_1+1/2)}} \sum_{i_2=2^{j(k_2+1/2)}}^{2^{j(k_2+1)}} f(i_1, i_2) + \right.$$
$$\left. \sum_{i_1=2^{j(k_1+1/2)}}^{2^{j(k_1+1)}} \sum_{i_2=2^{jk_2}}^{2^{j(k_2+1/2)}} f(i_1, i_2) \right)$$

In the example mathematical expressions of EQN (2), EQN (3) and EQN (4), all portions of the image 105 are weighted equally. As such, the sums defined in EQN (2), EQN (3) and/or EQN (4) can be realized with a binary mirror array 205. That is, a mirror 210 either reflects its corresponding image portion onto the detector 215 or not. The computation of other types of wavelet coefficients may require that different portions of the image be weighted differently. In such instances, a gray-scale mirror array may be used. Each mirror of a gray-scale mirror array is individually configurable to reflect or not reflect their corresponding portion onto the detector 215. When a gray-scale mirror is reflecting its corresponding portion onto the detector 215, the mirror is individually configurable to adjust how much of the corresponding portion is reflected onto the detector 215. Additionally or alternatively, a binary mirror array 205 may be used. In such an example, image portions assigned a first weight are captured as a first output 220, image portions assigned a second weight are captured as a second output 220, etc., with the outputs 220 subsequently weighted in the digital domain to form a particular sum used to compute a wavelet coefficient.

To control the example DMD module 110, the example compressed-image capture device 100 of FIG. 1 includes the example DMD controller 115. For a desired wavelet coefficient the example DMD controller 115 of FIG. 1 determines and/or computes which sums of combinations of mirrors 210 of the DMD module 110 are needed to compute the desired wavelet coefficient. For a particular combination, the DMD controller 115 provides control inputs 225 to the DMD module 110 and directs the DMD module 110 to acquire, capture and/or measure a detector output 220. For example, for a Haar wavelet coefficient of type 1, the example DMD controller 115 uses EQN (2) to determine which sums are to be acquired, captured and/or measured by the DMD module 110. The example DMD controller 115 configures a first combination of the mirrors 210 so that a first digital value 230 represents the first term of EQN (2), and configures a set combination of the mirrors 210 so that a second digital value 230 represents the second term of EQN (2). The example DMD controller 115 can likewise configure combinations of the mirrors 210 to compute the first and second terms of EQN (3) and EQN (4).

To compute wavelet coefficients, the example compressed-image capture device 100 of FIG. 1 includes a coefficient computation module 120. Using sums of image portions 230 computed by the DMD module 110, the example coefficient computation module 120 of FIG. 1 computes a wavelet coefficient. For example, for a Haar wavelet coefficient of type 1, the example coefficient computation module 120 computes the wavelet coefficient by computing a difference of two sums 230 computed by the DMD module 110, and multiplying the difference by a scale factor, as illustrated in EQN (2). The example coefficient computation module 120 of FIG. 1 stores the computed wavelet coefficient in a coefficient database 125 using any number and/or type(s) of data structure(s). The example coefficient database 125 of FIG. 1 may be implemented using any number and/or type(s) of memory(-ies), memory device(s) and/or storage device(s) such as a hard disk drive, a compact disc (CD), a digital versatile disc (DVD), a floppy drive, etc.

Figure 3:
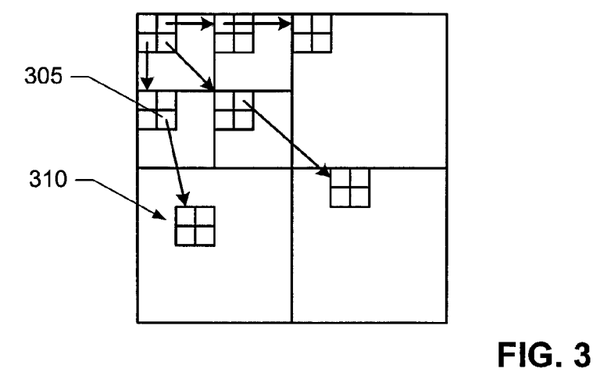
FIG. 3 is a diagram illustrating example relationships between wavelet coefficients of an image.

FIG. 3 is a recursive tree diagram illustrating example relationships between wavelet coefficients. Wavelet coefficients can be regarded as multi-scale edge detectors, where the absolute value of a wavelet coefficient corresponds to the local strength of the edge, that is, the amount of discontinuity present in the image at a particular location and scale. In the illustrated example of FIG. 3, low-frequency edges are depicted in the upper left-band corner with progressively higher-frequency edges occurring downward and/or rightward in the example diagram. Each (parent) wavelet coefficient of FIG. 3 is associated with four children coefficients that represent higher-frequency edge information related to the parent coefficient. For example, a parent coefficient 305 is associated with four children coefficients 310. If a particular wavelet coefficient is insignificant (e.g., has an absolute value less than a threshold), then with high probability its four children coefficients are also insignificant. Thus, by comparing each wavelet coefficient as it is computed with a threshold, a determination can be made whether to acquire, capture and/or sample its children wavelet coefficients. In this way, which and how many wavelet coefficients that are computed is adjusted and/or adapted while the compressed image is being captured. Detection of an edge at a particular resolution results in higher-resolution sampling of the detected edge. In this way, the example compressed-image capture device 100 of FIG. 1 implements an adaptive edge acquisition and/or detection device where acquisition resolution is adaptively increased in the vicinity of edges. In some examples, the threshold used to determine whether a computed wavelet coefficient is significant depends on the scale of the wavelet coefficient.

Additionally or alternatively, other methods, algorithms and/or criteria may be used to determine which wavelet coefficients are to be computed. For example, wavelet coefficients associated with a significant ancestor (e.g., having a different type) rather than just a significant direct parent may be captured. That is, a wavelet coefficient may be captured even though its direct parent is insignificant. For example, a wavelet coefficient may be identified for capture when a dot-product of the image 105 and a local shift of a previously computed wavelet are significant. While such approaches may increase the number of captured wavelet coefficients, they may improve the robustness of the resulting compressed image and/or decrease the probability of missing high-resolution details of some features of the image 105.

Returning to FIG. 1, the example coefficient computation module 120 of FIG. 1 compares the absolute value of computed wavelet coefficients with a threshold. If the absolute value of a computed wavelet coefficient is greater than the threshold, the coefficient computation module 120 adds indices to a sample queue 130 that represent and/or specify the children coefficients of the computed wavelet coefficient that are to be capture and/or sampled. The number of wavelet coefficients measured by the example compressed-image capture device 100 of FIG. 1 depends on the value of the threshold and the amount of visual activity in the image 105 (e.g., the number of edges). For the same image 105, a larger threshold results in fewer wavelet coefficients being captured. For the same threshold, a more visually active image 105 results in more wavelet coefficients being captured.

Indices of wavelet coefficients to be acquired, captured and/or measured may be stored in the sample queue 130 using any number and/or type(s) of data structures. In some examples, the index of a wavelet coefficient is represented as (e, j, k), where e represents wavelet sub-band and/or type, j represents scale (or resolution), and k represents location of the wavelet coefficient. The example sample queue 130 of FIG. 1 may be implemented using any number and/or type(s) of memory(-ies), memory device(s) and/or storage device(s) such as a hard disk drive, a CD, a DVD, a floppy drive, etc.

During operation, the example DMD controller 115 of FIG. 1 queries the example sample queue 130 to determine whether the sample queue 130 contains one or more indices of wavelet coefficients to be acquired, captured and/or measured. If the sample queue 130 is not empty, the example DMD controller 115 removes the next wavelet coefficient index from the sample queue 130, and configures the example DMD module 110 to compute the one or more sums needed by the coefficient computation module 120 to compute the corresponding wavelet coefficient.

To further reduce the amount of data needed to represent a compressed representation 135 of the image 105, the example compressed-image capture device 100 of FIG. 1 includes an image compression module 140. Using any number and/or type(s) of algorithm(s), method(s) and/or logic, the example image compression module 140 processes the wavelet coefficients 125 for the image 105 to further reduce redundancy and/or to reduce the amount of data needed to store and/or represent the wavelet coefficients 125. For example, the wavelet coefficients 125 may be quantized, and/or entropy encoded according to their tree-structure using, for example, a so-called "zero-tree" compression algorithm. In some examples, local groups of wavelet coefficients 125 at given scales are compressed into different data blocks. By grouping wavelet coefficients in different data blocks, only a portion of the compressed image 135 needs to be extracted to begin reconstructing the original image 105. Such groupings of wavelet coefficients facilitate the rendering of only a particular region-of-interest of the image 105, and/or facilitate the progressive reconstruction of the image 105 with increasing resolution as the remainder of the compressed image 135 is extracted and/or received. The example compressed image 135 may be stored using any number and/or type(s) of data structures in any number and/or type(s) of memory(-ies), memory device(s) and/or storage device(s) such as a hard disk drive, a CD, a DVD, a floppy drive, etc.

While an example compressed-image capture device 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example DMD controller 115, the example coefficient computation module 120, the example image compression module 140 and/or, more generally, the example compressed-image capture device 100 of FIG. 1 may be implemented by hardware, software, firmware and/or any combination of hardware, software and/or firmware. Thus, for example, any of the example DMD controller 115, the example coefficient computation module 120, the example image compression module 140 and/or, more generally, the example compressed-image capture device 100 may be implemented by one or more circuit(s), programmable processors, application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example DMD controller 115, the example coefficient computation module 120, the example image compression module 140 and/or, more generally, the example compressed-image capture device 100 are hereby expressly defined to include a tangible computer-readable medium such as a memory, a DVD, a CD, etc. storing the firmware and/or software. Further still, a compressed-image capture device may include interfaces, data structures, elements, processes and/or devices instead of, or in addition to, those illustrated in FIG. 1 and/or may include more than one of any or all of the illustrated interfaces, data structures, elements, processes and/or devices.

Figure 4A:
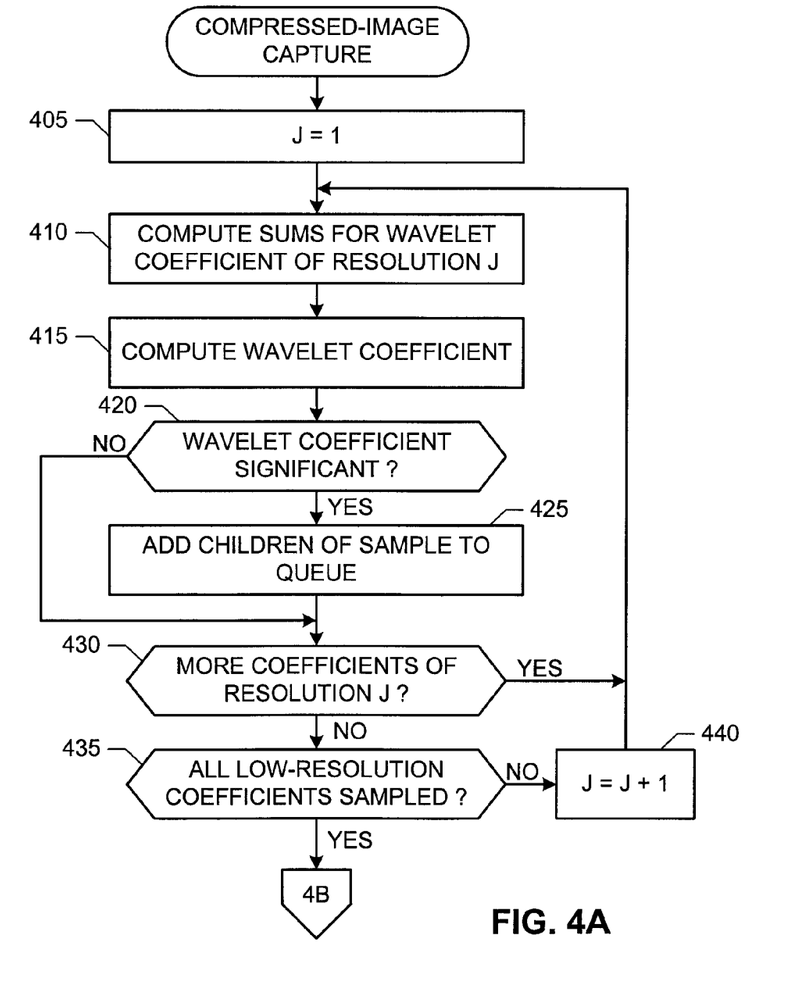
FIGS. 4A and 4B are a flowchart representative of an example process that may be carried out to implement the example compressed-image capture device of FIG. 1.
Figure 4B:
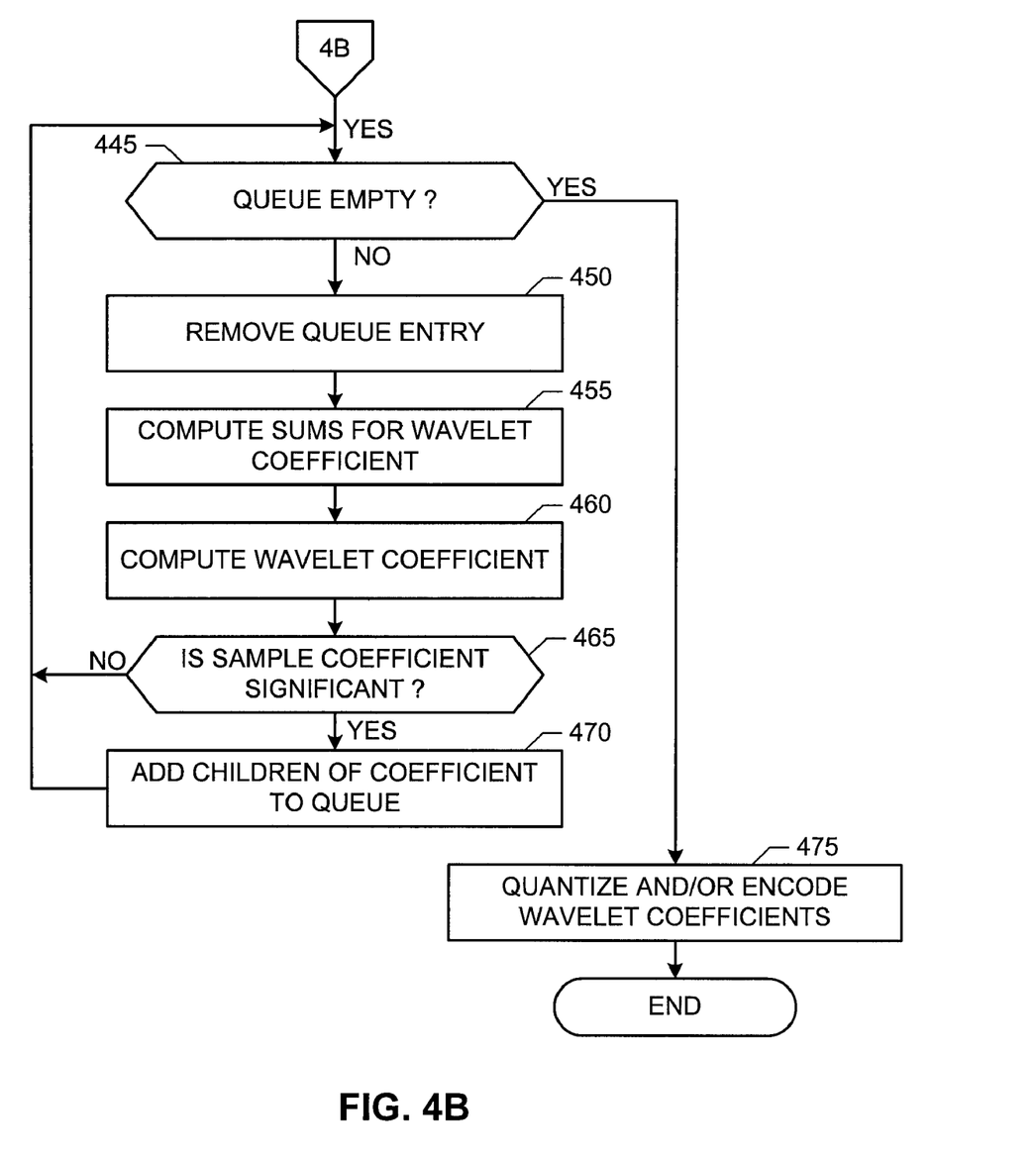

FIGS. 4A and 4B illustrate an example process that may be carried out to implement the example compressed-image capture device 100 of FIG. 1. The example process of FIGS. 4A and 4B may be carried out by a processor, a controller and/or any other suitable processing device. For example, the example process of FIGS. 4A and 4B may be embodied in coded instructions stored on a tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-readable instructions or data structures, and which can be accessed by a processor, a general purpose or special purpose computer or other machine with a processor (e.g., the example processor platform P100 discussed below in connection with FIG. 5). Combinations of the above are also included within the scope of computer-readable media. Machine-readable instructions comprise, for example, instructions and data that cause a processor, a general-purpose computer, special purpose computer, or a special-purpose processing machine to perform one or more particular processes. Alternatively, some or all of the example process of FIGS. 4A and 4B may be implemented using any combination(s) of ASIC(s), PLD(s), FPLD(s), discrete logic, hardware, firmware, etc. Also, some or all of the example process of FIGS. 4A and 4B may be implemented manually or as any combination of any of the foregoing techniques, for example, any combination of firmware, software, discrete logic and/or hardware. Further, many other methods of implementing the example operations of FIGS. 4A and 4B may be employed. For example, the order of execution of the blocks may be changed, and/or one or more of the blocks described may be changed, eliminated, sub-divided, or combined. Additionally, any or all of the example process of FIGS. 4A and 4B may be carried out sequentially and/or carried out in parallel by, for example, separate processing threads, processors, devices, discrete logic, circuits, etc.

The example process of FIGS. 4A and 4B begins the example coefficient computation DMD controller 115 (FIG. 1) setting a value J equal to 1 (block 405), and configuring the DMD module 110 to compute the sums for a first wavelet coefficient of resolution j=J (block 410). Using the sums computed by the example DMD module 110, the example coefficient computation module 120 computes the first wavelet coefficient of resolution j=J (block 415). If the computed wavelet coefficient is significant (e.g., its absolute value exceeds a threshold) (block 420), the coefficient computation module 120 adds indices representative of the child coefficient of the computed coefficient to the sample queue 130 (block 425). If the computed wavelet coefficient is not significant (block 420), control proceeds to block 430 without adding any indices to the sample queue 130.

If there are more wavelet coefficients of resolution j=J to compute (block 430), control returns to block 410 to compute the next wavelet coefficient of resolution j=J. If all wavelet coefficients of resolution j=J have been computed (block 430), the coefficient computation module 120 determines whether wavelet coefficients up to a particular resolution have been computed (block 435). If not all wavelet coefficients up to the particular resolution have been computed (block 435), J is incremented (block 440), and control returns to block 410 to compute the next wavelet coefficient.

If all wavelet coefficients up to the particular resolution have been computed (block 435), control proceeds to block 445 of FIG. 4B. The example DMD controller 115 (FIG. 1) determines whether the sample queue 130 is empty (block 445). If the sample queue 130 is not empty (block 445), the DMD controller 115 removes the next entry from the queue 130 (block 450) and configures the DMD module 110 to compute the sums for the wavelet coefficient represented by the removed entry (block 455). Using the sums computed by the example DMD module 110, the example coefficient computation module 120 computes the wavelet coefficient (block 460). If the computed wavelet coefficient is significant (e.g., its absolute value exceeds a threshold) (block 465), the coefficient computation module 120 adds indices representative of the child coefficient of the computed coefficient to the sample queue 130 (block 470). If the computed wavelet coefficient is not significant (block 465), control returns to block 445 without adding any indices to the sample queue 130.

Returning to block 445, if the sample queue 130 is empty (block 445), the example image compression module 140 quantizes and/or encodes the computed wavelet coefficients (block 475). Control then exits from the example process of FIGS. 4A and 4B.

Figure 5:
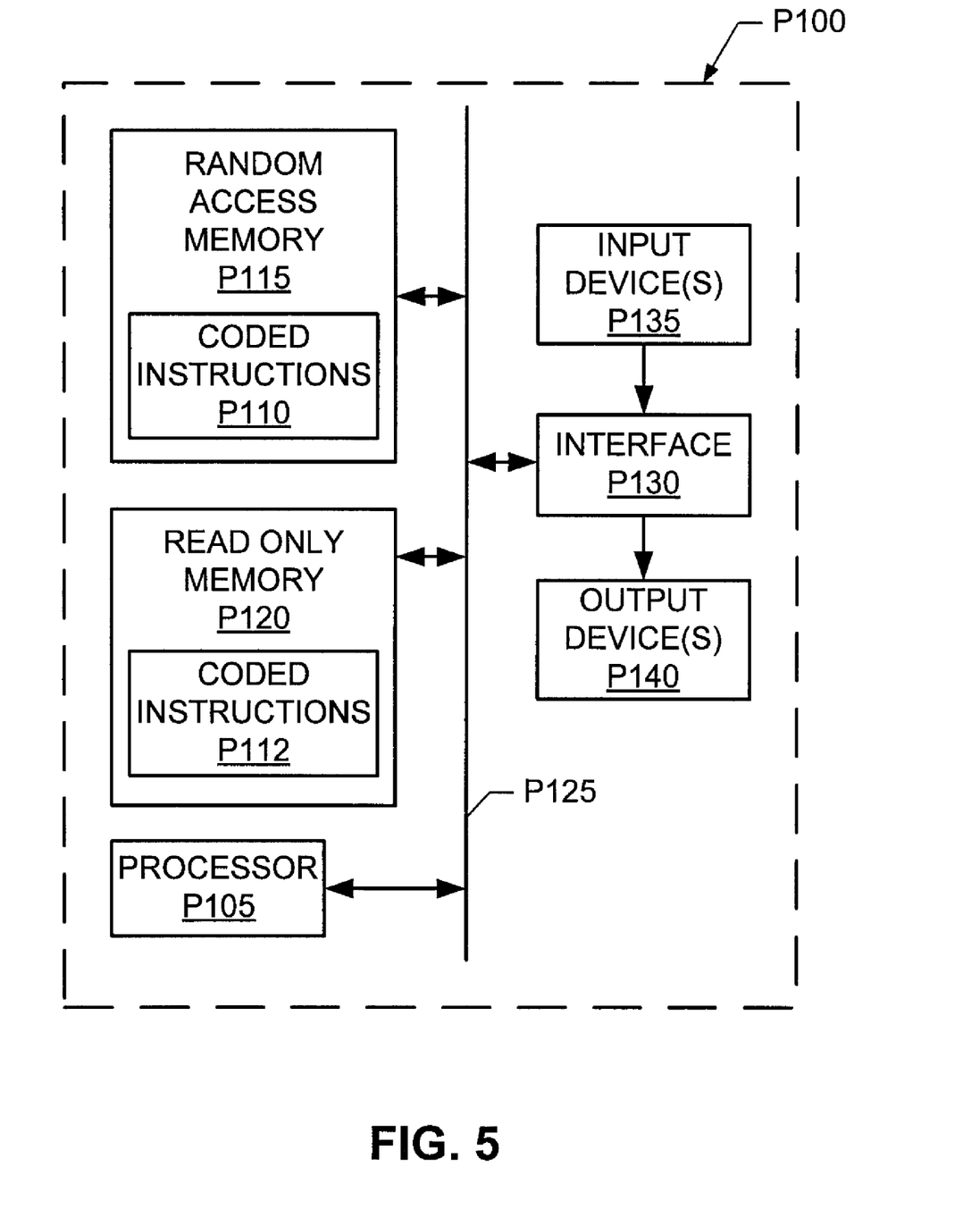
FIG. 5 is a schematic illustration of an example processor platform that may be used and/or programmed to carry out the example process of FIGS. 4A and 4B, and/or to implement any or all of the example methods and apparatus described herein.

FIG. 5 is a schematic diagram of an example processor platform P100 that may be used and/or programmed to implement any or all of the example compressed-image capture device 100 of FIG. 1. For example, the processor platform P100 can be implemented by one or more general-purpose processors, processor cores, microcontrollers, etc.

The processor platform P100 of the example of FIG. 5 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIGS. 4A and 4B to implement the example compressed-image capture methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example sample queue 130, the example coefficient database 125 and/or the example compressed image 135 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 may be used to, for example, implement the example detector 215 and/or the example ADC 235 of FIG. 2. The example output devices P140 may be used to, for example, control the example mirror array 205.

Generally, computer-executable instructions include routines, programs, objects, components, data structures, etc., that perform particular tasks or implement particular abstract data types. Computer-executable instructions, associated data structures, and program modules represent examples of program code for executing the processes to implement the example methods and systems disclosed herein. The particular sequence of such executable instructions and/or associated data structures represent examples of corresponding acts for implementing the examples described herein.

The example methods and apparatus described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Such network computing environments may encompass many types of computer system configurations, including personal computers, hand-held devices, multi-processor systems, microprocessor-based or programmable consumer electronics, network PCs, minicomputers, mainframe computers, and the like. The example methods and apparatus described herein may, additionally or alternatively, be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   capturing a first output of a first photodetector representative of a first weighted sum of a first plurality of portions of an image;
   capturing a second output of a second photodetector representative of a second weighted sum of a second plurality of portions of the image; and
   computing a first wavelet coefficient for the image using the first and second captured outputs.

2. A method as defined in claim 1, further comprising adjusting a mirror array to reflect the first plurality of portions of the image onto the first photodetector.

3. A method as defined in claim 1, further comprising applying a first plurality of weights to respective ones of the first plurality of portions of the image.

4. A method as defined in claim 3, wherein the first plurality of weights are substantially equal.

5. A method as defined in claim 1, wherein computing the first wavelet coefficient comprises:
   computing a difference of the first and second captured outputs; and
   computing a product of the difference and a scale factor.

6. A method as defined in claim 1, wherein second photodetector comprises the first photodetector.

7. A method as defined in claim 1, wherein the first plurality of portions of the image comprises pixels of the image.

8. A method as defined in claim 1, wherein capturing the first output of the first photodetector comprising performing an analog-to-digital conversion on the first output of the first photodetector to form a first value, and wherein the first wavelet coefficient is computed using the first value.

9. A method as defined in claim 1, further comprising comparing the first wavelet coefficient to a threshold to determine whether to capture a third output of the first photodetector representative of a third weighted sum of a third plurality of portions of the image, and to use the third output to compute a second wavelet coefficient.

10. A method as defined in claim 1, further comprising:
    capturing a third output of the first photodetector representative of a third weighted sum of a third plurality of portions of the image;
    capturing a fourth output of the second photodetector representative of a fourth weighted sum of a fourth plurality of portions of the image; and
    computing a second wavelet coefficient for the image using the third and fourth captured outputs.

11. A method as defined in claim 10, further comprising quantizing the first and second wavelet coefficients.

12. A method as defined in claim 10, further comprising compressing the first and second wavelet coefficients.

13. An apparatus comprising:
    a mirror array module;
    a mirror module controller to control the mirror array module to reflect a first plurality of portions of an image onto a detector at a first time and to reflect a second plurality of portions of the image onto the detector at a second time;
    a converter to form a first value representative of a first output of the detector at the first time and to form a second value representative of a second output of the detector at the second time; and
    a coefficient computation module to compute a first wavelet coefficient for the image using the first and second values.

14. An apparatus as defined in claim 13, wherein the first value represents a weighted sum of the first plurality of portions of the image.

15. An apparatus as defined in claim 13, further comprising a sampling coefficient queue, wherein the coefficient computation module is to compare the first wavelet coefficient to a threshold to determine whether to add to the sampling queue a third value representative of an index of a child wavelet coefficient of the first wavelet coefficient.

16. An apparatus as defined in claim 13, further comprising a sampling coefficient queue, wherein the mirror module controller is to determine whether the sampling queue contains a wavelet coefficient index, and when the sampling queue contains the index, control the mirror array module to reflect a third plurality of portions of the image onto the detector at a third time and to reflect a fourth plurality of portions of the image onto the detector at a fourth time, the third and fourth plurality of portions of the image determined based on to the wavelet coefficient index.

17. An apparatus as defined in claim 13, wherein:
the mirror module controller is to control the mirror array module to reflect a third plurality of portions of the image onto a detector at a third time and to reflect a fourth plurality of portions of the image onto the detector at a fourth time;
the converter is to capture a third value representative of a third output of the detector at the third time and to capture a fourth value representative of a fourth output of the detector at the fourth time; and
the coefficient computation module to compute a second wavelet coefficient for the image using the third and fourth values.

18. An apparatus as defined in claim 17, further comprising an image compression module to compute a first compressed coefficient from the first and second wavelet coefficients.

19. An apparatus as defined in claim 13, further comprising a coefficient database to store the first wavelet coefficients.

20. An apparatus as defined in claim 13, wherein the mirror array module comprises:
a mirror array having a plurality of mirrors, wherein each of the plurality of mirrors is configurable to reflect a corresponding portion of the image onto the detector;
a first lens to project the image onto the mirror array; and
a second lens to project a portion of the image reflected by a corresponding one of the mirrors onto the detector.

21. An article of manufacture including a non-transitory computer readable storage medium storing machine-readable instructions which, when executed, cause a machine to:
adjust a mirror array to reflect a first plurality of portions of an image onto a detector;
capture a first output of the detector representative of a first weighted sum of the first plurality of portions of the image;
adjust a second mirror array to reflect a second plurality of portions of the image onto the detector;
capture a second output of the detector representative of a second weighted sum of the second plurality of portions of the image; and
compute a first wavelet coefficient for the image using the first and second captured outputs.

22. An article of manufacture as defined in claim 21, wherein the machine-readable instructions, when executed, cause the machine to compute the first wavelet coefficient by:
computing a difference of the first and second captured outputs; and
computing a product of the difference and a scale factor.

23. An article of manufacture as defined in claim 21, wherein the machine-readable instructions, when executed, cause the machine to compare the first wavelet coefficient to a threshold to determine whether to capture a third output of the detector and to use the third output to compute a second wavelet coefficient.

24. An article of manufacture as defined in claim 21, wherein the machine-readable instructions, when executed, cause the machine to:
adjust a mirror array to reflect a third plurality of portions of an image onto the detector;
capture a third output of the detector representative of a third sum of the third plurality of portions of the image;
adjust the mirror array to reflect a fourth plurality of portions of the image onto the detector;
capture a fourth output of the detector representative of a fourth sum of the fourth plurality of portions of the image; and
compute a second wavelet coefficient for the image using the third and fourth captured outputs.

* * * * *